(12) United States Patent
Yokota et al.

(10) Patent No.: US 11,420,303 B2
(45) Date of Patent: Aug. 23, 2022

(54) 5-AXIS PROCESSING MACHINE

(71) Applicant: Sodick Co., Ltd., Kanagawa (JP)

(72) Inventors: Shoya Yokota, Yokohama (JP); Michihisa Kawasaki, Yokohama (JP); Munetaka Ambai, Yokohama (JP)

(73) Assignee: Sodick Co., Ltd., Yokohama (JP)

( * ) Notice: Subject to any disclaimer, the term of this patent is extended or adjusted under 35 U.S.C. 154(b) by 13 days.

(21) Appl. No.: 17/201,330

(22) Filed: Mar. 15, 2021

(65) Prior Publication Data

US 2021/0294295 A1 Sep. 23, 2021

(30) Foreign Application Priority Data

Mar. 18, 2020 (JP) .............................. JP2020-048350
Apr. 22, 2020 (JP) .............................. JP2020-076202

(51) Int. Cl.
*B23Q 15/26* (2006.01)
*G05B 19/404* (2006.01)
*B23Q 15/12* (2006.01)
*B23Q 16/00* (2006.01)
*B23Q 23/00* (2006.01)
(Continued)

(52) U.S. Cl.
CPC ............. *B23Q 15/26* (2013.01); *B23C 1/027* (2013.01); *B23Q 15/12* (2013.01); *B23Q 16/007* (2013.01); *B23Q 23/00* (2013.01); *G05B 19/402* (2013.01); *G05B 19/404* (2013.01); *B23Q 2716/08* (2013.01); *G05B 2219/36262* (2013.01); *G05B 2219/49344* (2013.01)

(58) Field of Classification Search
None
See application file for complete search history.

(56) References Cited

U.S. PATENT DOCUMENTS 8,260,453 B2 * 9/2012 Otsuki ................. G05B 19/404
   318/568.18
2012/0191238 A1 7/2012 Sakai et al.

FOREIGN PATENT DOCUMENTS

JP   2010140312 A   6/2010
JP      4637197 B2   2/2011
(Continued)

OTHER PUBLICATIONS

Office Action dated Dec. 6, 2021 in Japan Patent Application No. 2020-076202 with English translation; 6 pgs.
(Continued)

*Primary Examiner* — Ryan A Jarrett
(74) *Attorney, Agent, or Firm* — Maier & Maier, PLLC

(57) ABSTRACT

A 5-axis processing machine includes a mounting table on which a tool and a work piece are placed; and a control unit including a calculation unit, a determination unit, and a correction unit; wherein the mounting table is moved relatively by three linear axes and two rotation axes based on NC data, the two rotation axes include a first axis and a second axis, the calculation unit calculates an orientation of the work piece with respect to the tool at a time of processing from NC data and a directions of rotation centers of an actual first axis and an actual second axis, the determination unit determines whether or not the calculated orientation of the work piece is included in an inoperable range, the inoperable range being the inoperable angle range, and the correction unit corrects the orientation of the work piece with respect to the tool.

7 Claims, 14 Drawing Sheets

(51) Int. Cl.
*B23C 1/027* (2006.01)
*G05B 19/402* (2006.01)

(56) References Cited

FOREIGN PATENT DOCUMENTS

| | | |
|---|---|---|
| JP | 2012-164306 A | 8/2012 |
| JP | 201365254 A | 4/2013 |
| JP | 2013-196130 A | 9/2013 |
| JP | 5461980 B2 | 4/2014 |
| JP | 201691466 A | 5/2016 |

OTHER PUBLICATIONS

Office Action dated Nov. 16, 2021, in connection with corresponding Japanese Application No. 2020-048350 (8 pp., including machine-generated English translation).

* cited by examiner

5-AXIS PROCESSING MACHINE

CROSS-REFERENCE TO RELATED APPLICATION

This application claims priority to Japanese Patent Applications, JP2020-048350 filed on Mar. 18, 2020, JP2020-076202 filed on Apr. 22, 2020, and the entire contents of which are incorporated by reference herein.

FIELD

The present invention relates to a 5-axis processing machine and a control method of the 5-axis processing machine.

BACKGROUND

Conventionally, a 5-axis machine is known, which has three linear axes and two rotation axes and processes a work piece by changing the relative positions and orientations in the 5 axes of a processing tool and a work piece. For example, Patent Literature 1 discloses a 5-axis processing machine that corrects an error in the rotating shaft for processing.

CITATION LIST

Patent Literature

Patent Literature 1: JP2012-164306 A

SUMMARY

However, in the configuration described in Patent Document 1, if at least one of the two rotation axes is tilted due to an error that may occur when the processing tool and the work piece are attached, all postures may not be realized. That is, the relative posture input from the NC data cannot be realized on the actual rotation axis. In such a case, an appropriate calculation result cannot be obtained because the posture cannot be realistically taken. As a result, an error occurs in the control unit of the rotation axis.

The present invention has been made in view of such circumstances, and an object of the present invention is to provide a 5-axis processing machine that perform more stable control and to provide a control method of the 5-axis processing machine.

According to the present invention, provided is a 5-axis processing machine comprising a mounting table on which a tool and a work piece are placed; and a control unit including a calculation unit, a determination unit, and a correction unit; wherein the mounting table is moved relatively by three linear axes and two rotation axes based on NC data, the two rotation axes include a first axis and a second axis, the calculation unit calculates an orientation of the work piece with respect to the tool at a time of processing from NC data and a directions of rotation centers of an actual first axis and an actual second axis, the determination unit determines whether or not the calculated orientation of the work piece is included in an inoperable range, the inoperable range being the inoperable angle range, and the correction unit corrects the orientation of the work piece with respect to the tool when the calculated orientation of the work piece is included in the inoperable range.

With such a configuration, it is possible to provide a 5-axis processing machine that performs more stable control.

DETAILED DESCRIPTION

Hereinafter, embodiments of the present invention will be described with reference to the drawings. The various features shown in the embodiments shown below can be combined with each other, and each independently constitutes the invention. Further, the X-axis, Y-axis, and Z-axis directions will be defined in the description below based on the Coordinates Shown in FIG. 1A.

1. The Embodiment

1.1. 5-Axis Processing Machine 100

Figure 1A:
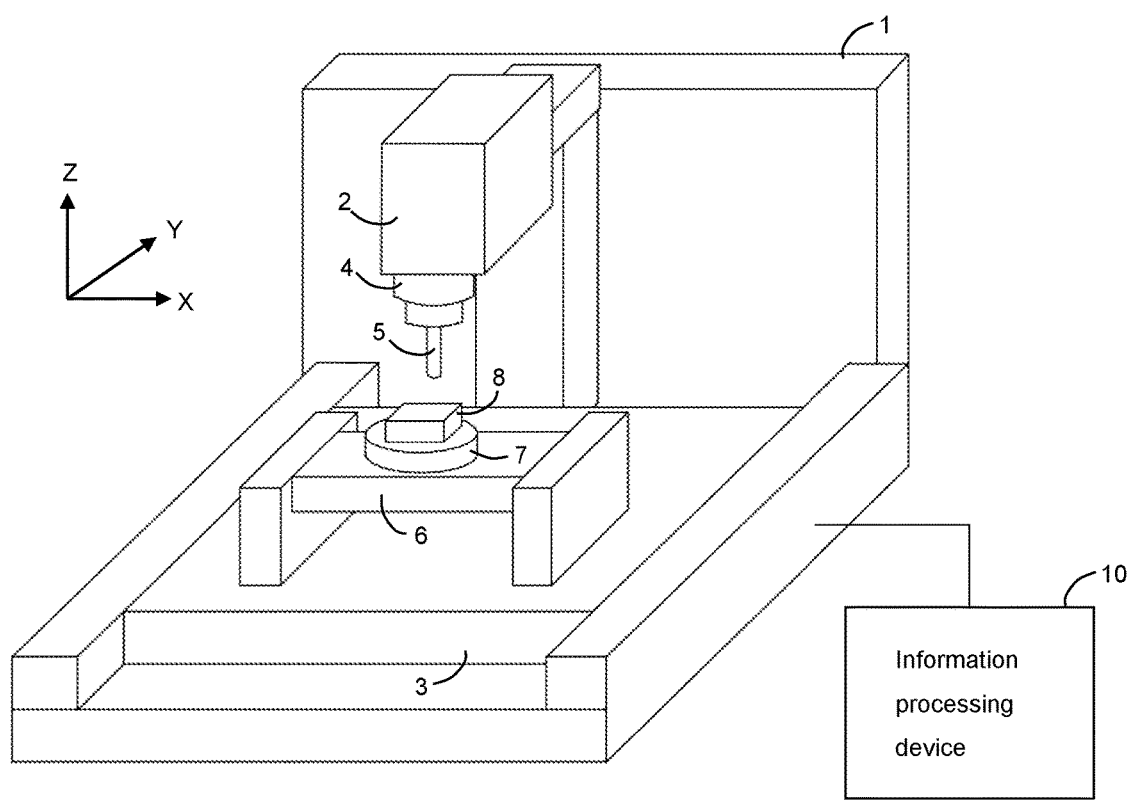
FIG. 1A is a schematic perspective view of a 5-axis processing machine 100 according to an embodiment of the present invention.
Figure 1B:
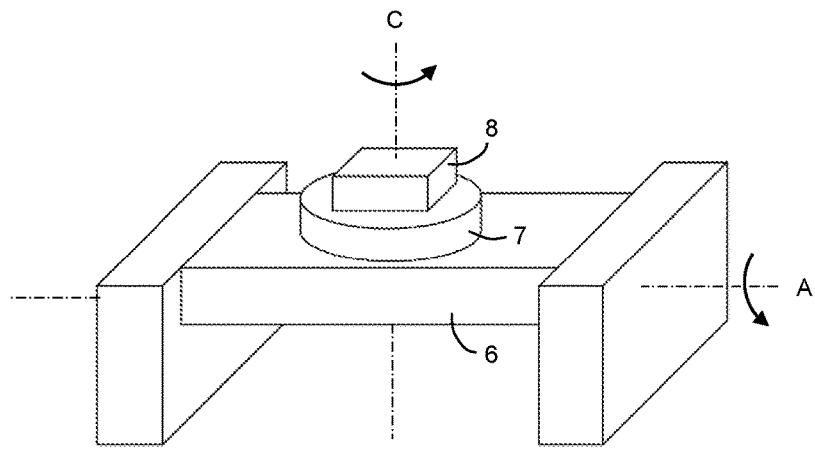
FIG. 1B is a schematic perspective view of a 5-axis processing machine 100 according to an embodiment of the present invention.

With reference to FIG. 1, a configuration of the 5-axis processing machine 100 will be described. As shown in FIGS. 1A and 1B, the 5-axis processing machine 100 performs 5-axis control of three linear axes of X-axis, Y-axis, and Z-axis, and two rotation axes of A-axis (corresponding to "first axis" in the claims) and C-axis (corresponding to "second axis" in the claims). The 5-axis processing machine 100 includes a processing machine body 1, a processing head 2, a Y-axis moving table 3, and an information processing device 10.

The processing head 2 is configured to be movable in the X-axis direction and the Z-axis direction with respect to the processing machine body 1. The processing head 2 is provided with a mounting portion 4 for mounting a tool 5. By rotating the mounting portion 4, the tool 5 can be rotated to perform cutting.

The Y-axis moving table 3 is configured to be movable in the Y-axis direction with respect to the processing machine body 1. A tilt table 6 is placed on the Y-axis moving table 3. A rotary table 7 is further placed on the tilt table 6. Here, the concept including the tilt table 6 and the rotary table 7 corresponds to "a mounting table" in the claims. The worker can process a work piece 8 by the tool 5 after placing the work piece 8 on the rotary table 7.

The tilt table 6 is configured to be rotatable around the A-axis as a rotation axis, and is placed on the Y-axis moving table 3 so that the A-axis and the X-axis are parallel to each other. The rotary table 7 is configured to be rotatable around the C-axis as a rotation axis, and is placed on the tilt table 6 so that the C-axis and the Z-axis are parallel to each other when the rotation angle of the A-axis is 0°. The posture of the work piece 8 placed on the rotary table 7 with respect to the tool can be changed for machining by rotating the tilt table 6 around the A-axis and the rotary table 7 around the C-axis at arbitrary angles.

As described above, it is desirable that the A-axis of the tilt table 6 is installed parallel to the X-axis and that the C-axis of the rotary table 7 is installed parallel to the Z-axis. However, the A-axis and the C-axis are mounted in a state of being tilted with respect to the X-axis and the Z-axis respectively, due to the processing error or the mounting error of each table. Therefore, in the present embodiment, the actual directions of the rotation centers of the A-axis and the C-axis (hereinafter, also simply referred to as the directions of the A-axis and the C-axis) are measured and used in the processing. The method of measuring the direction of the rotation center of the rotation axis will be described in detail later.

The information processing device 10 analyzes NC data about the processing object and outputs a movement instruction to the processing machine body 1. Hereinafter, the functional configuration of the information processing device 10 will be described in detail.

1.2. Functional Configuration of Information Processing Device 10

Figure 2:
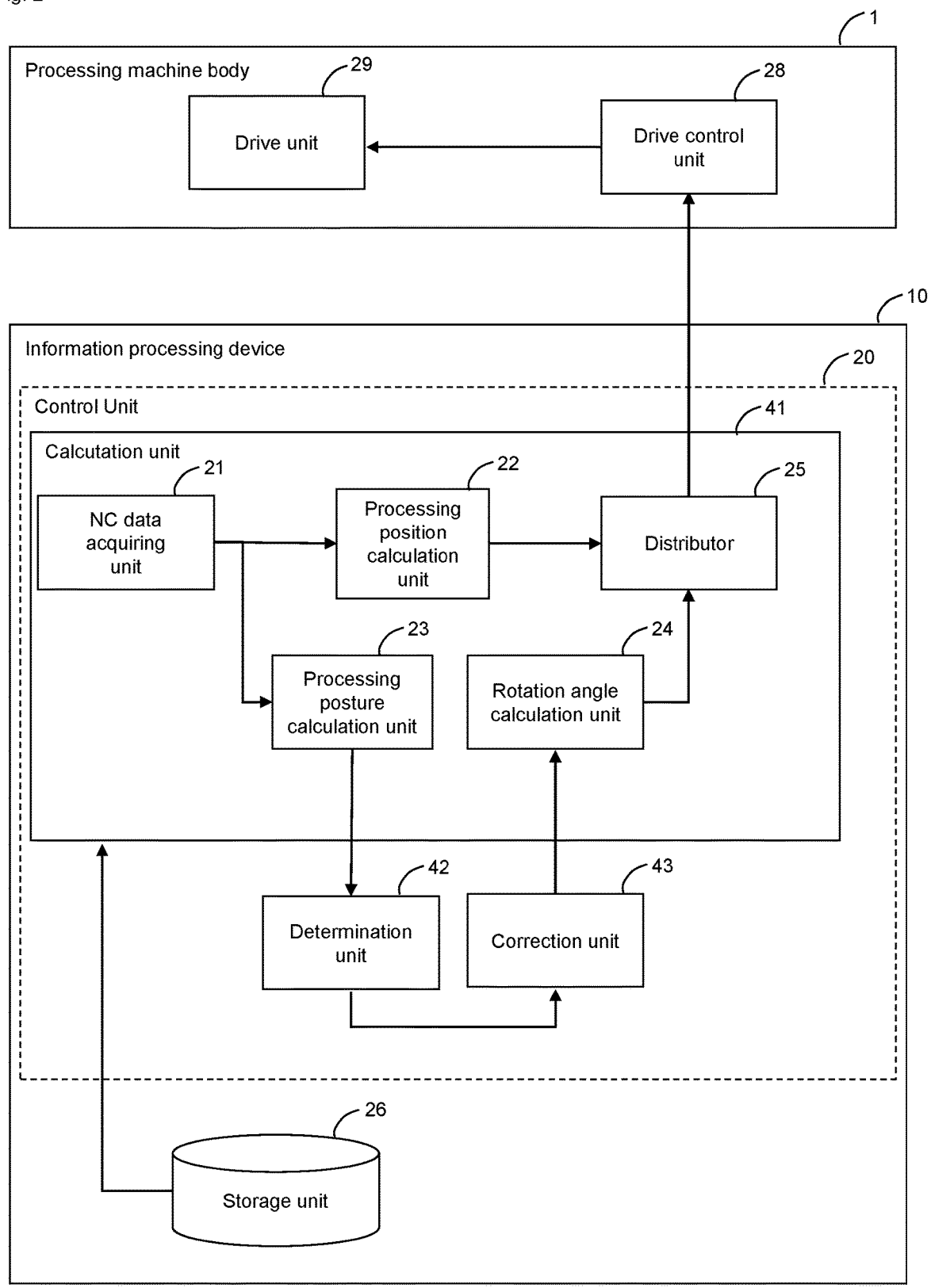
FIG. 2 is a functional configuration diagram of the information processing device 10.

With reference to FIG. 2, the functional configuration of the information processing device 10 will be described. As shown in FIG. 2, the information processing device 10 includes a control unit 20 and a storage unit 26. The control unit 20 is composed of, for example, a CPU (Central Processing Unit), a microprocessor, a DSP (Digital Signal Processor), and the like, and controls the overall operation of the information processing device 10.

The storage unit 26 is composed of, for example, a RAM (Random Access Memory), a DRAM (Dynamic Random Access Memory), or the like, and is used as a work area or the like when the control unit 20 performs processing based on various programs. Further, the storage unit 26 includes a non-volatile memory such as a ROM (Read Only Memory) or an SSD (Solid State Drive), and stores data and programs used for processing of the control unit 20.

The control unit 20 includes a calculation unit 41, a determination unit 42, and a correction unit 43. The calculation unit 41 includes an NC data acquisition unit 21, a processing position calculation unit 22, a processing posture calculation unit 23, a rotation angle calculation unit 24, and a distributor 25.

The NC data acquisition unit 21 acquires NC data about the processing object stored in the storage unit 26. The processing position calculation unit 22 calculates the processing position and the amount of movement along the linear axis direction at each processing point of the work piece 8 based on the acquired NC data.

The processing posture calculation unit 23 calculates the posture of the work piece 8 with respect to the tool 5 at the time of processing at each processing point of the work piece 8 based on the acquired NC data. Here, the NC data is generated assuming that the A-axis and the C-axis are parallel to the X-axis and the Z-axis respectively. The processing posture calculation unit 23 further calculates the posture of the work piece 8 with respect to the tool 5 between the processing points (hereinafter, referred to as an intermediate posture) specified in the NC data. The details of the method of calculating the intermediate posture will be described later.

As described above, the NC data is generated assuming that the A-axis and the C-axis are parallel to the X-axis and the Z-axis. However, in reality, the A-axis and the C-axis may be tilted with respect to the X-axis and the Z-axis respectively, due to mounting errors of the tilt table 6 and the rotary table 7. Therefore, the rotation angle calculation unit 24 calculates the rotation angle θ of the A-axis and the rotation angle Φ of the C-axis in the actual 5-axis control processing machine 100, in order to realize the posture of the work piece 8 at the time of processing calculated by the processing posture calculation unit 23. The details of the calculation method of the rotation angles θ and Φ will be described later.

The distributor 25 distributes and outputs movement instructions for the three linear axes and the two rotating axes to the drive control unit 28 of the processing machine body 1, based on the data output from the processing position calculation unit 22 and the rotation angle calculation unit 24 By controlling the drive unit 29, the drive control unit 28 drives the Y-axis moving table 3, the processing head 2, the tilt table 6, and the rotary table 7, and realizes movement with respect to the three linear axes and the two rotation axes.

The determination unit 42 determines whether or not the orientation of the work piece with respect to the tool calculated by the calculation unit 41 is included in an inoperable range, which is an inoperable angle range. The details of the determination method by the determination unit 42 will be described later.

The correction unit 43 corrects the orientation of the work piece with respect to the tool when the calculated orientation of the work piece with respect to the tool is included in the inoperable range. The details of the determination method by the correction unit 43 will be described later.

1.3. Measurement Method of the Rotation Center Direction of the Rotation Axis With reference to FIG. 3, a method of measuring the direction of the rotation center of the rotation axis will be described. Various methods are already known for measuring the direction of the rotation axis, but as an example, a method for measuring the direction of the C-axis will be described.

Figure 3A:
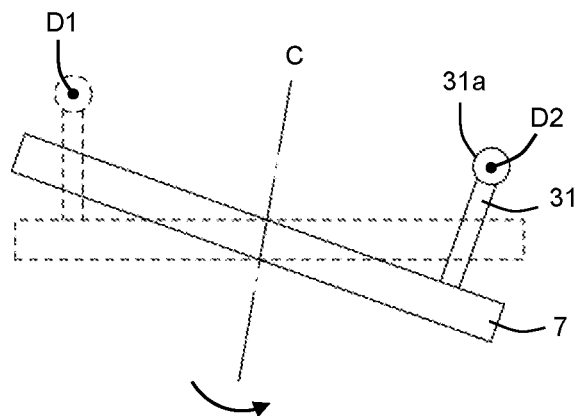
FIG. 3A is a view in which the measuring bar 31 is attached to the rotary table 7.
Figure 3B:
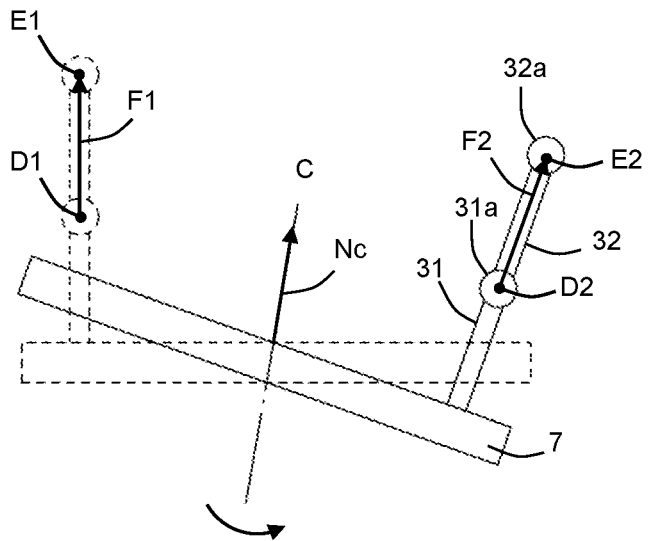
FIG. 3B is a diagram in which the extension bar 32 is attached to the measuring bar 31.

As shown in FIG. 3A, a rod-shaped measuring bar 31 is vertically erected on the rotary table 7 to measure the center position D1 of the reference ball 31a provided on the upper part of the measuring bar 31. After that, the rotary table 7 is rotated by 180°, and the position D2 at the center of the reference ball 31a is measured again.

Next, an extension bar 32 is mounted on the measuring bar 31, and the position E1 at the center of the reference ball 32a provided on the upper part of the extension bar 32 is measured. After that, the rotary table 7 is rotated by 180°, and the position E2 at the center of the reference ball 32a is measured again.

In this way, an axis vector Nc that specifies the direction of the rotation center of the C-axis is defined between the vector F1 obtained by the positions D1 and D2 and the vector F2 obtained by the positions E1 and E2. That is, the axis vector Nc can be obtained from the positions of the first and second points of the rod-shaped object standing vertically on the rotary table 7, and the positions of the first and second points with the rotary table 7 rotated 180 degrees around the C-axis. The calculation of the axis vector Nc need not be performed every time of processing. The axis vector Nc may be calculated at the time of installation of the rotary table 7 and at each maintenance of the 5-axis processing machine 100, and the calculated data may be stored in the storage unit 26.

1.4. Process Contents of Calculation Unit 41

1.4.1. Calculation Method of Intermediate Posture

Figure 4A:
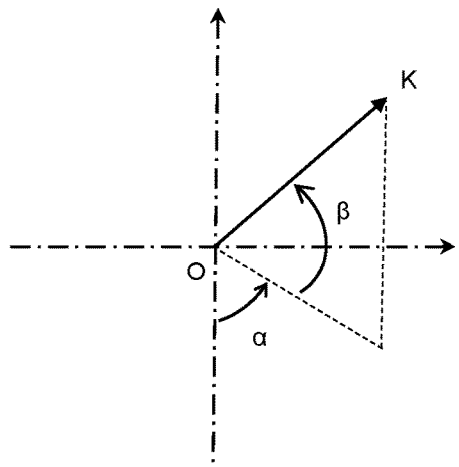
FIG. 4A is a diagram for explaining the posture vector K and the rotation around the rotation axis.

With reference to FIG. 4, the calculation method of the intermediate posture will be described. As described above, the intermediate posture represents the posture (that is, the orientation) of the work piece 8 with respect to the tool 5 between the processing points specified in the NC data. In the present embodiment, the posture of the work piece 8 with respect to the tool 5 is represented by a posture vector K having a size of 1. As shown in FIG. 4A, the rotation angles $\alpha$ and $\beta$ in the two rotation axes can be uniquely defined by the vector.

Figure 4B:
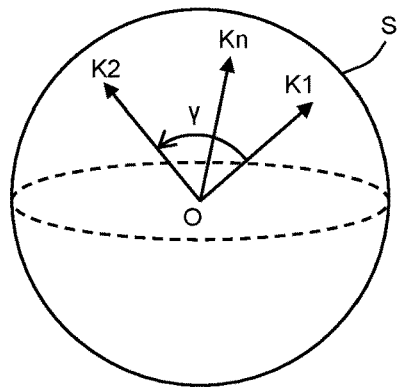
FIG. 4B is a diagram for explaining a posture vector Kn showing an intermediate posture.

In the example shown in FIG. 4B, a posture vector K1 indicating the posture of the work piece 8 with respect to the tool 5 at a certain processing point and a posture vector K2 indicating the posture of the work piece 8 with respect to the tool 5 at the next processing point are shown. In this case, the posture vector Kn between the posture vector K1 and the posture vector K2 is the intermediate posture.

At first, the processing posture calculation unit 23 assumes a great circle distance L on the spherical surface S of the three dimensional sphere defined by the posture vector K1 and the posture vector K2. A point on the spherical surface S specifies the angle at which the work piece 8 faces the tool 5. The great circle distance L represents the shortest length between two points on the spherical surface S. The processing posture calculation unit 23 further divides the great circle distance L into a predetermined number and calculates a posture vector Kn that specifies the posture of the work piece 8 with respect to the tool 5 at each division point determined by the division. Here, n is an index (0≤n<N) representing the position of the division point, and N represents the number of divisions of the great circle distance L.

Figure 4C:
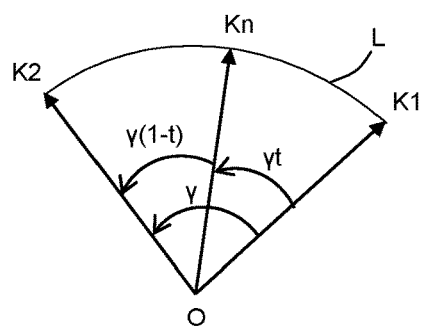
FIG. 4C is a diagram for explaining a method of calculating a posture vector Kn indicating an intermediate posture.

Specifically, as shown in FIG. 4C, the posture vector Kn is obtained by the following equation (1) provided that the rotation angle from the posture vector K1 to the posture vector K2 is $\gamma$.

$$K_n = \frac{\sin(\gamma(1-t))}{\sin\gamma}K1 + \frac{\sin(\gamma t)}{\sin\gamma}K2 \qquad (1)$$

Here, t is a parameter that takes a value of 0<t<1, and is set according to the number of divisions N of the great circle distance L. For example, the posture vector Kn is obtained for each division point specified by t=0.2, 0.4, 0.6, 0.8 provided that the great circle distance L is divided into five. In this way, the processing posture calculation unit 23 calculates the intermediate posture between the processing points defined in the NC data.

1.4.2. Calculation of Rotation Angles $\theta$ and $\Phi$

1.4.2.1. Calculation Method of Rotation Angle

Figure 5A:
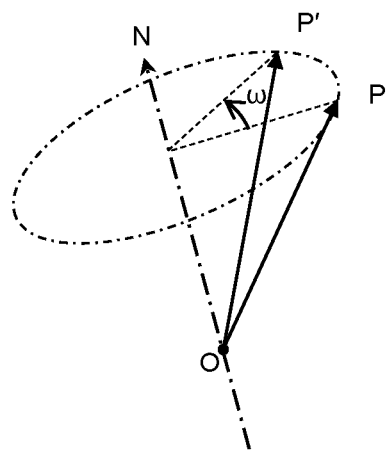
FIG. 5A is a diagram for explaining the rotation of a vector P around an arbitrary vector N.

With reference to FIG. 5A, a method of calculating the rotation angle $\theta$ around the A-axis and the rotation angle $\Phi$ around the C-axis will be described. First, the rotation angle calculation unit 24 acquires the axis vector Na that specifies the actual A-axis direction and the axis vector Nc that specifies the actual C-axis direction stored in the storage unit 26.

The rotation angle calculation unit 24 calculates the actual rotation angles of the A-axis and the C-axis when moving from the posture vector K that specifies one posture to the posture vector K' that specifies the next posture, with respect to the posture vector K at the processing point and the intermediate posture calculated by the processing posture calculation unit 23. Here, the rotation angle calculation unit 24 uses the Rodrigues rotation formula represented by the following equations (2) and (3).

$$Rn(\omega) = \begin{pmatrix} n_1^2(1-\cos\omega)+\cos\omega & n_1n_2(1-\cos\omega)-n_3\sin\omega & n_1n_3(1-\cos\omega)+n_2\sin\omega \\ n_1n_2(1-\cos\omega)+n_3\sin\omega & n_2^2(1-\cos\omega)+\cos\omega & n_2n_3(1-\cos\omega)+n_1\sin\omega \\ n_1n_3(1-\cos\omega)-n_2\sin\omega & n_2n_3(1-\cos\omega)+n_1\sin\omega & n_3^2(1-\cos\omega)+\cos\omega \end{pmatrix} \qquad (2)$$

$$N = \begin{pmatrix} n_1 \\ n_2 \\ n_3 \end{pmatrix} \tag{3}$$

Here, as shown in FIG. 5A, the rotation matrix Rn transforms an arbitrary vector P into a vector P' rotated by an angle ω around the vector N. Using this rotation formula, the rotation angle calculation unit 24 generates the equations represented by the following equation (4) to (8).

$$Ra(\theta) \cdot Rc(\varphi) \cdot K = K' \tag{4}$$

$$Ra(\theta) = \begin{pmatrix} n_{a1}^2(1-\cos\theta)+\cos\theta & n_{a1}n_{a2}(1-\cos\theta)-n_{a3}\sin\theta & n_{a1}n_{a3}(1-\cos\theta)+n_{a2}\sin\theta \\ n_{a1}n_{a2}(1-\cos\theta)+n_{a3}\sin\theta & n_{a2}^2(1-\cos\theta)+\cos\theta & n_{a2}n_{a3}(1-\cos\theta)-n_{a1}\sin\theta \\ n_{a1}n_{a3}(1-\cos\theta)-n_{a2}\sin\theta & n_{a2}n_{a3}(1-\cos\theta)+n_{a1}\sin\theta & n_{a3}^2(1-\cos\theta)+\cos\theta \end{pmatrix} \tag{5}$$

$$Rc(\varphi) = \begin{pmatrix} n_{c1}^2(1-\cos\varphi)+\cos\varphi & n_{c1}n_{c2}(1-\cos\varphi)-n_{a3}\sin\varphi & n_{c1}n_{c3}(1-\cos\varphi)+n_{c2}\sin\theta \\ n_{c1}n_{c2}(1-\cos\varphi)+n_{c3}\sin\varphi & n_{c2}^2(1-\cos\varphi)+\cos\varphi & n_{c2}n_{c3}(1-\cos\varphi)-n_{c1}\sin\varphi \\ n_{c1}n_{c3}(1-\cos\varphi)-n_{c2}\sin\varphi & n_{c2}n_{c3}(1-\cos\varphi)+n_{c1}\sin\varphi & n_{c3}^2(1-\cos\varphi)+\cos\varphi \end{pmatrix} \tag{6}$$

$$Na = \begin{pmatrix} n_{a1} \\ n_{a2} \\ n_{a3} \end{pmatrix} \tag{7}$$

$$Nc = \begin{pmatrix} n_{c1} \\ n_{c2} \\ n_{c3} \end{pmatrix} \tag{8}$$

Here, Ra (θ) is a rotation matrix that represents a rotation around the A-axis by a rotation angle θ. Rc (Φ) is a rotation matrix that represents a rotation around the C-axis by a rotation angle of Φ. The factor of $n_{a1}$, $n_{a2}$ and $n_{a3}$ are components of vector Na. The factor of $n_{c1}$, $n_{c2}$ and $n_{c3}$ are components of the vector Nc.

Figure 5B:
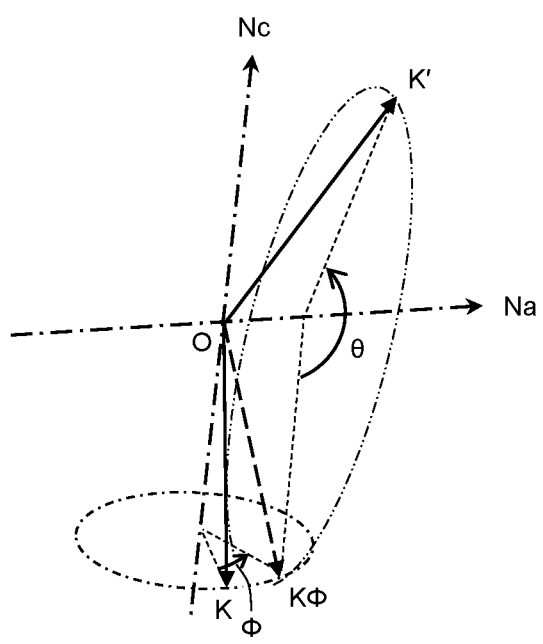
FIG. 5B is a diagram for explaining rotation around the A-axis and the C-axis.

As shown in FIG. 5B, the equation (4) means that the next posture vector K' is obtained when the posture vector K is rotated an angle Φ around the C-axis by the rotation matrix Rc and is rotated an angle θ around the A-axis by the rotation matrix Ra. Here, in FIG. 5B, the vector obtained by rotating the posture vector K an angle Φ around the C-axis is represented by KΦ.

The rotation angle calculation unit 24 solves the equation (4) for θ and Φ. As a result, the rotation angle θ around the A-axis and the rotation angle Φ around the C-axis are calculated when moving the posture from the posture vector K to the next posture vector K' at the processing point calculated by the processing posture calculation unit 23.

1.4.2.2. Rotation Angle Calculation Procedure

Hereinafter, the calculation procedure of the rotation angles θ and Φ for the posture vector K and the intermediate posture vector Kn calculated by the processing posture calculation unit 23 will be described.

In the following description, the posture vector K of the processing point and the intermediate posture vector Kn are collectively referred to as the posture vectors $K_{m,n}$. In this notation, m is an index (0≤m≤M) representing the position of the processing point, and M represents the number of processing points. Further, n is an index (0≤n<N) representing the position of the division point, and N represents the number of divisions. That is, in this notation of the posture vectors $K_{m,n}$, the case of n=0 corresponds to the posture vector K of the processing point, and the case of n≠0 corresponds to the intermediate posture vector Kn.

As an example, $K_{0,0}$ is an initial posture vector indicating the initial posture of the tool, and in this embodiment, $K_{0,0}$=(0,0,1) is set. $K_{m,0}$ is a posture vector indicating the posture at the m-th processing point. $K_{m,n}$ is the nth intermediate posture vector between the m-th processing point and the m+1-th processing point. $K_{M,0}$ is a posture vector indicating the posture at the final processing point.

First, the intermediate posture vectors $K_{0,m}$ is calculated by the following equation (9), provided that the initial posture vector $K_{0,0}$ is divided into N between the posture vector $K_{1,0}$ of the first processing point, and that the intermediate posture vectors are notated as $K_{0,1}$, $K_{0,2}$, $K_{0,3}$, ..., $K_{0,n}$, ..., $K_{0,N-1}$, respectively. Here, in the case of equal division, $t_n$=n/N.

$$K_{0,n} = \frac{\sin(\gamma(1-t_n))}{\sin\gamma}K_{0,0} + \frac{\sin(\gamma t_n)}{\sin\gamma}K_{0,1} \tag{9}$$

Next, the rotation angles $\theta_{m,n}$ around the A-axis and the rotation angles $\Phi_{m,n}$ around the C-axis are obtained for each intermediate posture. Here, the rotation angles $\theta_{m,n}$ is rotation angle around the A-axis for moving from the n-th intermediate posture vector to the n+1-th intermediate posture vector between the m-th processing point and the m+1th processing point. Similarly, the rotation angles $\Phi_{m,n}$ is the rotation angles around the C-axis for moving from the nth intermediate posture vector to the n+1-th intermediate posture vector between the m-th processing point and the m+1-th processing point. The rotation angles $\theta_{0,n}$ and $\Phi_{0,n}$ satisfy the following equation (10).

$$Ra(\theta_{0,n}) \cdot Rc(\varphi_{0,n}) \cdot K_{0,n} = K_{0,n+1} \tag{10}$$

In this way, the rotation angles $\theta_{m,n}$ a around the A-axis and the rotation angles $\Phi_{m,n}$ around the C-axis are calculated from the initial posture vector $K_{0,0}$ in the order of $K_{0,1}$, $K_{0,2}, \ldots, K_{0,N-1}, K_{1,0}, K_{1,1}, \ldots, K_{M,0}$.

The generalization of equations (9) and (10) gives the following equations (11) and (12).

$$K_{m,n} = \frac{\sin(\gamma(1-t_n))}{\sin\gamma} K_{m,0} + \frac{\sin(\gamma t_n)}{\sin\gamma} K_{m+1,0} \quad (11)$$

$$Ra(\theta_{m,n}) \cdot Rc(\varphi_{m,n}) \cdot K_{m,n-1} = K_{m,n} \quad (12)$$

1.5. Process Contents of Determination Unit 42

Figure 6A:
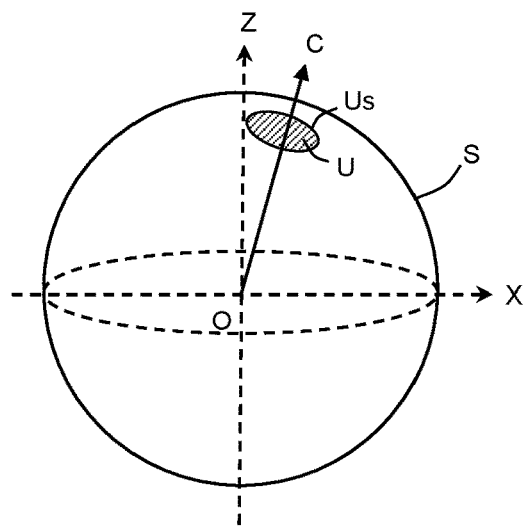
FIG. 6A is a diagram showing an inoperable range U.
Figure 6B:
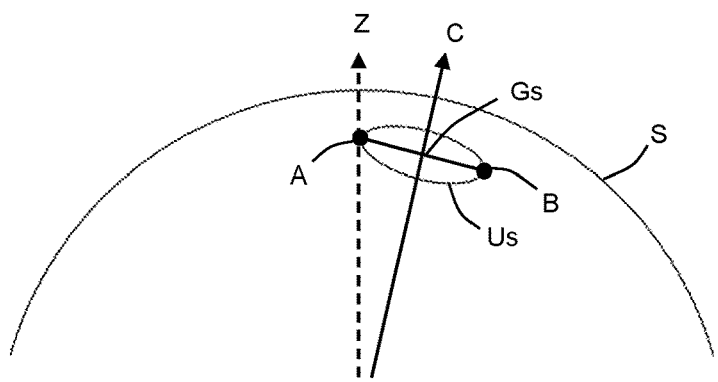
FIG. 6B is a diagram for explaining a boundary Us on the inoperable range U.
Figure 6C:
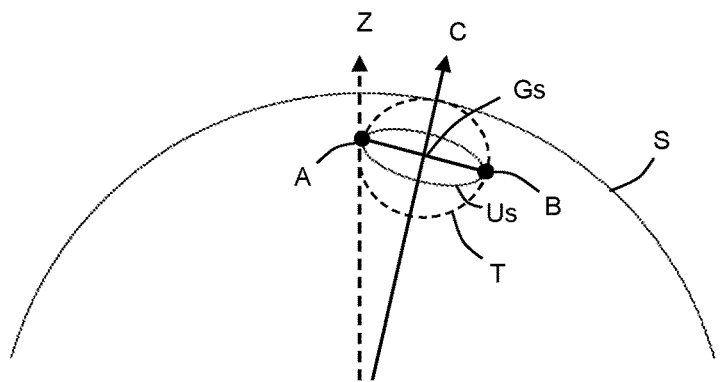
FIG. 6C is a diagram for explaining a method of determining whether or not a posture is included in the inoperable range U.

With reference to FIG. 6A to FIG. 6C, the process contents of the determination unit 42 will be described. As described above, the C-axis may be tilted with respect to the Z-axis due to an error at mounting the tilt table 6 and the rotary table 7. In this case, as shown in FIG. 6A, the inoperable range U is formed around the C-axis on the spherical surface S.

The inoperable range U means the orientation of the workpiece with respect to the tool, which cannot be taken no matter how the tilt table 6 and the rotary table 7 are rotated. If the above-described rotation angle calculation process is performed based on the posture specified within the inoperable range U, the rotation angle cannot be calculated and an error occurs, resulting in unstable rotation control.

Therefore, the determination unit 42 determines whether or not the posture vector K at the processing point obtained from NC data and the posture specified by the intermediate posture vector Kn calculated from the posture vector K are included in the inoperable range U. The determination method will be described below.

As shown in FIG. 6B, the point where the Z-axis intersects the spherical surface S is defined as the intersection point A. The position of the intersection point A is (0, 0, 1). Further, a point obtained by rotating the intersection point A 180 degrees around the C-axis is defined as a point B. At this time, the boundary Us of the inoperable range U is represented as a circle having the diameter of the line segment AB. That is, the circle is centered on the point Gs on the C-axis, which is the center of the line segment AB. Here, the inoperable range U corresponds a region on the spherical surface S surrounded by the boundary Us.

Next, as shown in FIG. 6C, assuming a three dimensional sphere T having a diameter of line segment AB. Here, the three dimensional sphere T is represented by the following equation (13) provided that the radius of the sphere T (that is, the length of the line segment AGs) is r and the position of the central point Gs is (a, b, c).

$$(x-a)^2 + (y-b)^2 + (z-c)^2 = r^2 \quad (13)$$

The determination unit 42 substitutes the x-coordinate value, y-coordinate value, and z-coordinate value of the posture vector K and the intermediate posture vector Kn into the equation (13). Then, in the case that the calculated value is smaller than $r^2$, the determination unit 42 determines that the posture is included in the inoperable range U.

1.6. Process Contents of Correction Unit 43

1.6.1. Processing Point Correction

Figure 7A:
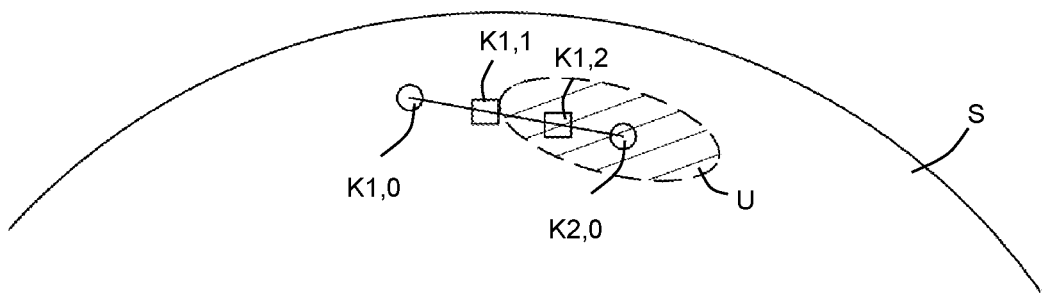
FIG. 7A is a diagram for explaining a processing point correction.
Figure 7B:
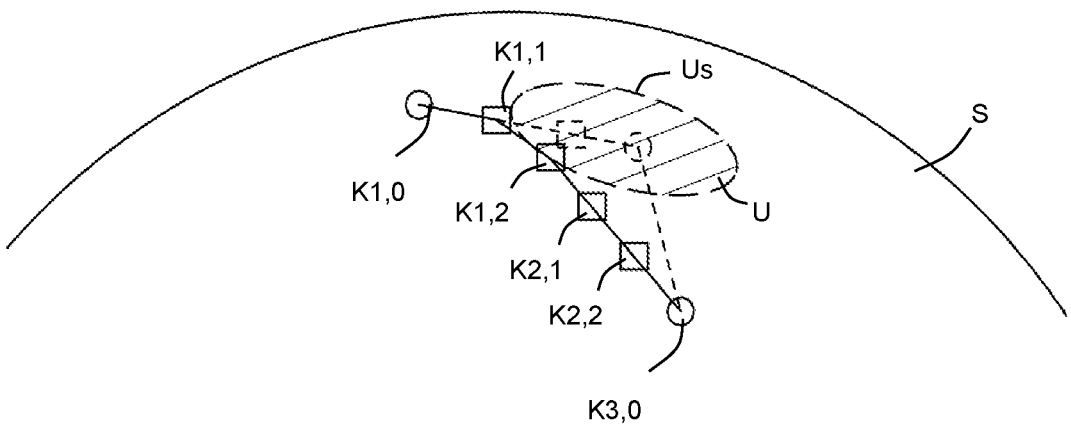
FIG. 7B is a diagram for explaining a division process in the processing point correction.

With reference to FIGS. 7A and 7B, the contents of the processing point correction performed by the correction unit 43 will be described. The processing point correction process is performed when the posture vector K at the processing point specified in the NC data is included in the inoperable range U As an example, FIG. 7A shows the trajectory of the posture from the posture vector $K_{1,0}$ to the posture vector $K_{2,0}$. In this example, as the original process, the processing posture calculation unit 23 divides the trajectory from the posture vector $K_{1,0}$ to the posture vector $K_{2,0}$ by the number of divisions N (here N=3). Then, the processing posture calculation unit 23 calculates the intermediate posture vector $K_{1,1}$ and the posture vector $K_{1,2}$ as division points.

However, as shown in FIG. 7A, the angle corresponding to the posture cannot be calculated, since the posture vector $K_{0,2}$ at the processing point specified in the NC data is included in the inoperable range U. Therefore, the correction unit 43 performs processing point correction when the determination unit 42 determines that the posture vector $K_{0,2}$ at the processing point is included in the inoperable range U.

Specifically, as shown in FIG. 7B, with respect to the intermediate posture vector $K_{1,2}$ initially included in the inoperable range U, the closest point on the boundary Us of the inoperable range U (hereinafter, also simply referred to as the closest point) is calculated while the posture shifts from the posture vector $K_{1,0}$ to the posture vector $K_{2,0}$. Then, the intermediate posture vector $K_{1,2}$ is offset (positionally displaced) to the closest point. The calculation method of the closest point will be described later. Then, the correction unit 43 waits for the subsequent NC data, and does not perform the subsequent calculation process of the rotation angle when the posture shifts to the offset intermediate posture vector $K_{1,2}$.

After that, at the timing when the posture vector $K_{3,0}$ specified in the subsequent NC data goes out of the inoperable range U, the correction unit 43 divides the angle between the intermediate posture vector $K_{1,2}$ on standby and the posture vector $K_{3,0}$ outside the inoperable range U by the number of divisions N (here, N=3). Then, the correction unit 43 calculates the intermediate posture vector $K_{2,1}$ and the intermediate posture vector $K_{2,2}$. By performing such processing point correction, it is possible to correct the posture included in the inoperable range U and perform the subsequent calculation process of the rotation angle, in the case that the posture vector K at the processing point specified in the NC data is included in the inoperable range U.

1.6.2. Offset Correction

Figure 8A:
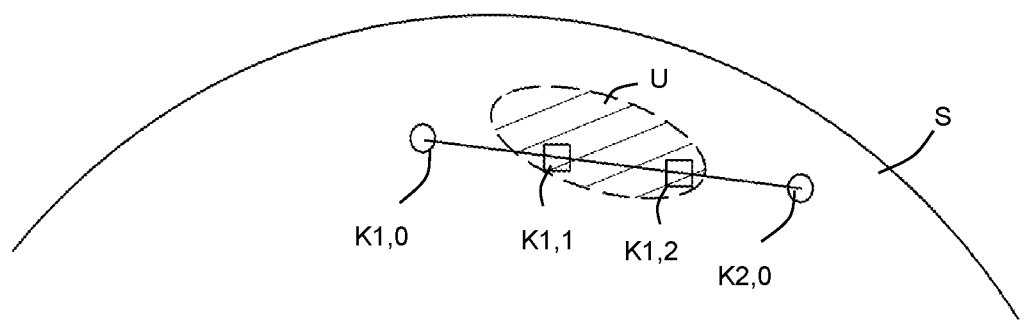
FIG. 8A is a diagram for explaining an intermediate posture correction.
Figure 8B:
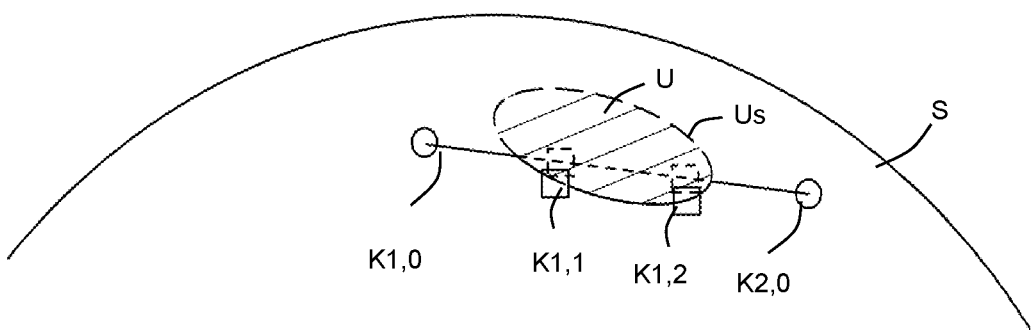
FIG. 8B is a diagram for explaining an offset correction in the intermediate posture correction.

With reference to FIGS. 8A and 8B, the contents of the offset correction performed by the correction unit 43 will be described. The offset correction is a correction process when the intermediate posture vector Kn calculated by the processing posture calculation unit 23 is included in the inoperable range U.

In the example shown in FIG. 8A, the posture vector $K_{1,0}$ and the posture vector $K_{2,0}$ at the processing point defined in the NC data are not included in the inoperable range U. However, the intermediate posture vectors $K_{1,1}$ and $K_{1,2}$ calculated by the processing posture calculation unit 23 are included in the inoperable range U.

In this case, the correction unit 43 performs the offset correction. Specifically, as shown in FIG. 8B, the closest points on the boundary Us of the inoperable range U are calculated with respect to the intermediate posture vectors $K_{1,1}$ and $K_{1,2}$ respectively included in the inoperable range U. Then, the correction unit 43 offsets the intermediate posture vectors $K_{1,1}$ and $K_{1,2}$. By performing such offset correction, it is possible to correct the posture included in the inoperable range U and perform the subsequent calculation process of the rotation angle, in the case that the intermediate posture vector K calculated by the processing posture calculation unit 23 is included in the inoperable range U.

1.6.3. Center Avoidance Correction

Figure 9A:
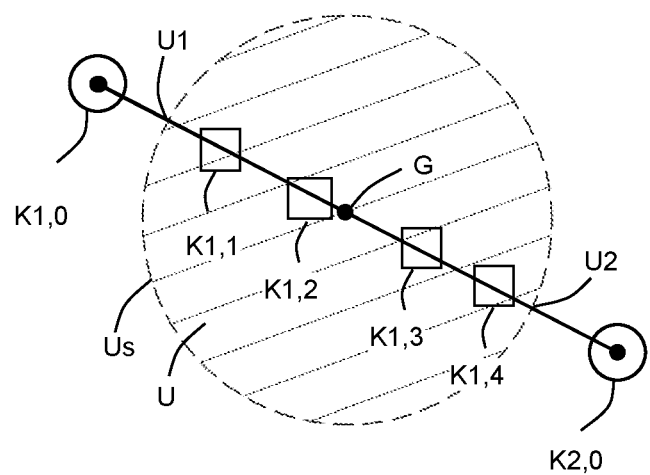
FIG. 9A is a diagram showing an example of intermediate posture correction process.
Figure 9B:
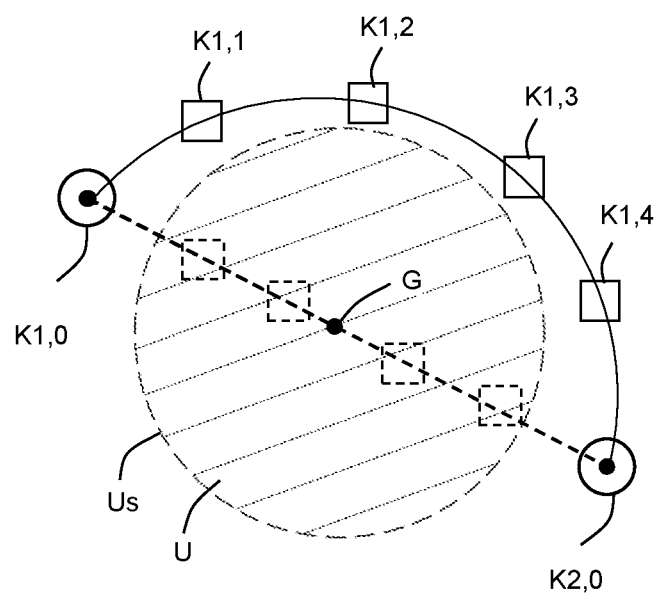
FIG. 9B is a diagram for explaining center avoidance correction.

With reference to FIGS. 9A and 9B, the contents of the center avoidance correction in the offset correction will be described. The center avoidance correction is a correction process when the offset correction is performed and the trajectory of the intermediate posture passes through the center point in the inoperable range U.

In the example shown in FIG. 9A, the trajectory of the intermediate posture vectors $K_{1,1}$ to $K_{1,4}$ pass through the center point G of the inoperable range U, in the case that the posture shifts from the posture vector $K_{1,0}$ to the posture vector $K_{2,0}$ at the processing point specified in the NC data. Since the center point G is on the C-axis, if the posture of the work piece with respect to the tool is shifted on such a trajectory, the rotation control around the C-axis becomes unstable. Therefore, in the case that the trajectory of the intermediate posture Kn passes through the center point of the inoperable range U, the center avoidance correction is performed by the correction unit 43.

Specifically, as shown in FIG. 9B, the trajectory from the posture vector $K_{1,0}$ to the posture vector $K_{2,0}$ is divided by the number of divisions N (here, N=5). Then, the postures corresponding to the outside of the inoperable range U are set to the intermediate posture vectors $K_{1,1}$ to $K_{1,4}$. In this way, it becomes possible to perform rotation control around the C-axis in a more stable manner.

Whether or not to perform the center avoidance correction is determined based on whether or not the closest point of the intermediate posture vector Kn in the inoperable range U has changed. As shown in FIG. 9A, the closest point of the intermediate posture vectors Ku, and $K_{1,2}$ is the intersection U1 of the trajectory of transition from the posture vector $K_{1,0}$ to the posture vector $K_{2,0}$ and the boundary Us. Further, the closest point of the intermediate posture vectors $K_{1,3}$ and $K_{1,4}$ is the intersection U2 at the other side of the trajectory and the boundary Us.

In this way, the correction unit 43 performs the center avoidance correction, judging that the trajectory of the intermediate posture Kn passes through the center point of the inoperable range when the closest point calculated in the offset correction does not change.

16.4. Calculation Method of Closest Point

Figure 10A:
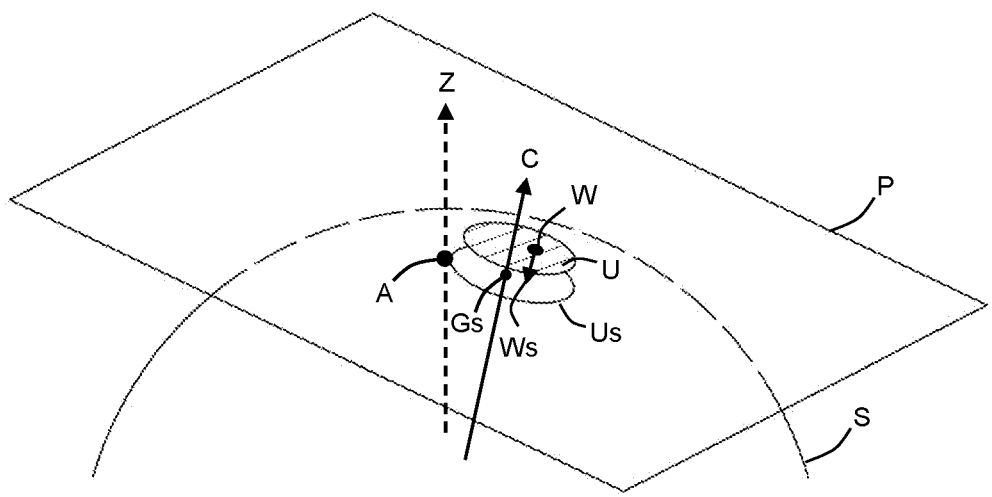
FIG. 10A is a diagram for explaining a method of calculating a closest point.
Figure 10B:
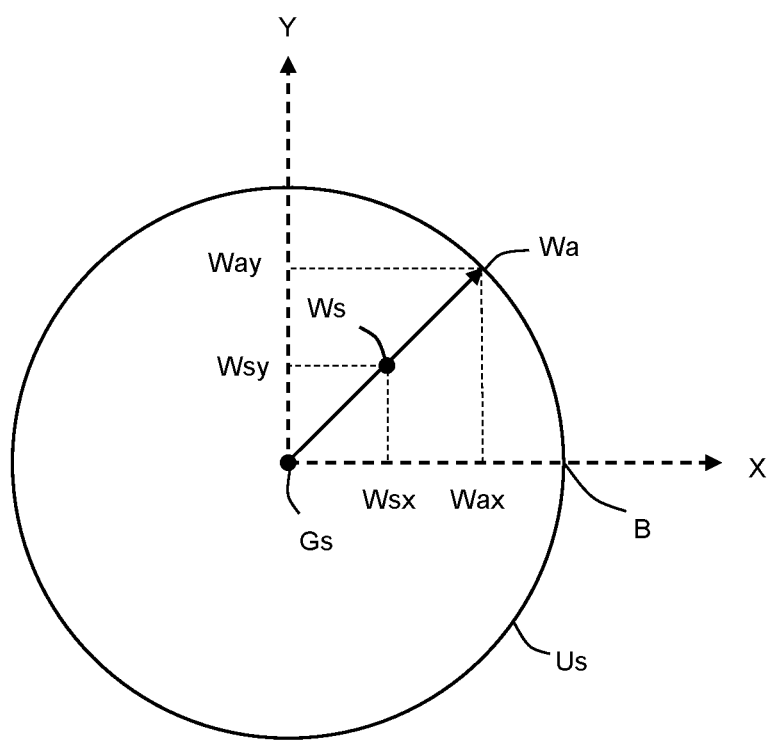
FIG. 10B is a diagram for explaining the coordinate calculation on a plane P in the calculation of the closest point.
Figure 11:
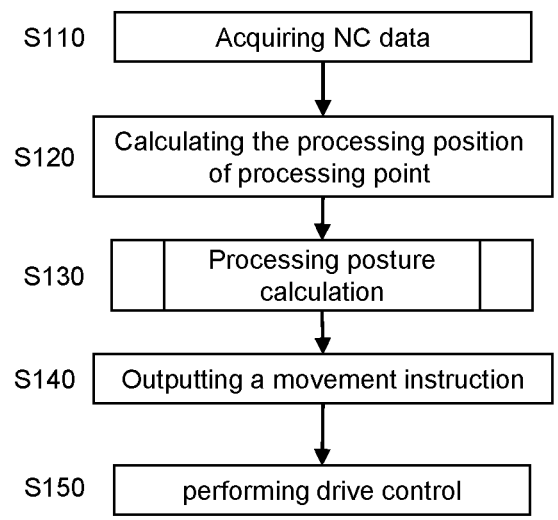
FIG. 11 is a diagram for explaining a processing procedure in the 5-axis processing machine 100.

With reference to FIGS. 10A and 10B, a method of calculating the closest point in the offset correction will be described. As an example, a method of calculating the closest point Wa of the posture point W representing the intermediate posture in the inoperable range U is shown. Note that FIG. 10A is a diagram in which the inoperable range U is cut out on the plane P defined by the boundary Us and moved in the Z-axis direction for visibility.

1.6.4.1. Outline of Calculation Procedure

First, as shown in FIG. 10A, a perpendicular line (that is, a line parallel to the C-axis) is drawn from the posture point W on the plane P. Then, provided that the intersection of the perpendicular and the plane P is Ws, the position of the intersection Ws is calculated. Next, as shown in FIG. 10B, provided that the center Gs of the region surrounded by the boundary Us on the plane P is the origin, the position of the point Wa on the boundary Us is calculated. Here, the line connecting the center Gs and the intersection Ws intersect the boundary Us at the point Wa. The point Wa is the closest point to the posture point W in the inoperable range U.

1.6.4.2. Example of Calculation Method

The following is an example of a specific calculation method. Note that the calculation method described below is only an example based on geometric calculation, and present invention is not limited to this calculation method.

First, in FIG. 10A, let the slope vector of the C-axis be (i, j, k). Since the plane P includes the point A (0, 0, 1), the plane P can be expressed by the following equation (14).

$$i(x-0)+j(y-0)+k(z-1)=0 \Leftrightarrow ix+jy+kz-k=0 \quad (14)$$

Next, provided that the posture point W=(Wx, Wy, Wz), the length L from posture point W to the plane P can be expressed by the following equation (15) using a known mathematical formula.

$$L = \frac{|iWx + jWy + kWz - k|}{\sqrt{i^2 + j^2 + k^2}} \quad (15)$$

Here, provided that the intersection Ws=(Sx, Sy, Sz), the following equation (16) holds because the intersection Ws is at a position where the posture point W is moved in the (−i, −j, −k) direction by the length L. As a result, the position of the intersection Ws can be obtained if posture point W is given.

$$(Sx, Sy, Sz) = (Wx, Wy, Wz) - \frac{|iWx + jWy + kWz - k|}{i^2 + j^2 + k^2}(i, j, k) \quad (16)$$

Next, with reference to FIG. 10B, the position of the closest point Wa based on the intersection Ws is calculated. Provided that the position of the center Gs is (a, b, c) and the position of the intersection point B of the X-axis and the boundary Us is (d, e, f), the following equations (17) and (18) hold about the vector GsB connecting the center Gs and the intersection point B, and the vector GsWsx. Here, t is a parameter representing a scalar multiple, and the point Wsx is a foot of a perpendicular line drawn from the intersection Ws on the X-axis with the center Gs as the origin.

$$GsB=(d-a, e-b, f-c) \quad (17)$$

$$GsWsx=t \times GsB=t(d-a, e-b, f-c) \quad (18)$$

Here, since the vector WsWsx is the sum of the vector WsGs and the vector GsWsx, the following equation (19) holds.

$$WsWsx = WsGs + GsWsx \quad (19)$$
$$= (a - Sx, b - Sy, c - Sz) + t(d - a, e - b, f - c)$$
$$= (a - Sx + t(d - a), b - Sy + t(e - b), c - Sz + t(f - c))$$

Further, since the vector WsWsx and the vector GsB are perpendicular to each other, the following equations (20) and (21) hold.

$$(d-a)(a-Sx+t(d-a))+ \\ (e-b)(b-Sy+t(e-b))+(f-c)(c-Sz+t(f-c))=0 \quad (20)$$

$$t = \frac{(d-a)(a-Sx)+(e-b)(b-Sy)+(f-c)(c-Sz)}{(d-a)^2+(e-b)^2+(f-c)^2} \quad (21)$$

In this way, since the parameter t is obtained, the magnitude of the vector GsWsx can be obtained. Further, the magnitude of the vector GsWsy can be obtained in the same manner. As a result, the position of the intersection Ws can be obtained as (Wsx, Wsy) with the center Gs as the origin. Then, the position of Wa can be obtained as a solution of the following equations (22) and (23).

$$y = \frac{Wsy}{Wsx}x \quad (22)$$

$$x^2 + y^2 = r^2 \quad (23)$$

1.7. Flow of Processing

With reference to FIG. 11 to FIG. 14, the flow of processing by the 5-axis processing machine 100 will be described. In step S110 of FIG. 11, the control unit 20 of the information processing device 10 acquires NC data stored in the storage unit 26 for the processing object. In step S120, the control unit 20 calculates the processing position for each processing point.

In step S130, the control unit 20 performs a processing posture calculation. In step S140, the control unit 20 outputs a movement instruction about the three linear axes and the two rotation axes to the processing machine body 1. In step S150, the drive unit 29 performs drive control for the three linear axes and the two rotation axes.

Figure 12:
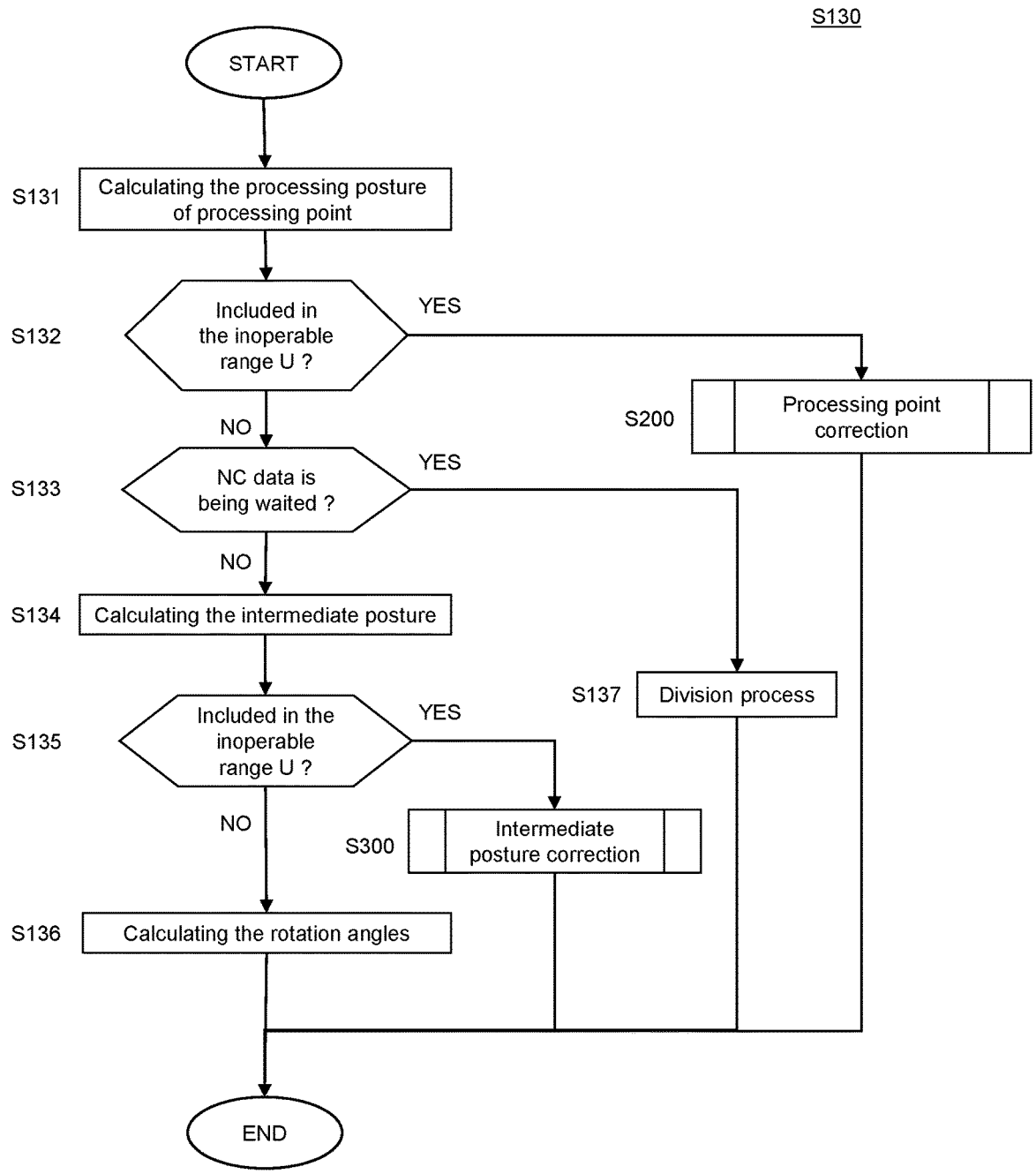
FIG. 12 is a diagram for explaining a procedure of processing posture calculation at step S130 in FIG. 11.

With reference to FIG. 12, the flow of the processing posture calculation process (step S130) will be described. In step S131, the processing posture calculation unit 23 calculates the posture vector K that specifies the processing posture for each processing point. In step S132, the determination unit 42 determines whether or not the posture vector K at the processing point is included in the inoperable range U.

If the posture vector K at the processing point is included in the inoperable range U (YES at step S132), the processing point correction by the correction unit 43 is performed as step S200. On the other hand, if the posture vector K at the processing point is not included in the inoperable range U (NO at step S132), step S133 is performed.

In step S133, the determination unit 42 determines whether or not subsequent NC data is being waited. If the subsequent NC data is being awaited, as step S137, the correction unit 43 performs a division process (See paragraph [0072]) from the intermediate posture on standby to the posture of the processing point calculated this time. On the other hand, if the subsequent NC data is not being awaited, step S134 is performed.

In step S134, the processing posture calculation unit 23 calculates the intermediate posture vector Kn for the intermediate posture. In step S135, the determination unit 42 determines whether or not the intermediate posture vector Kn is included in the inoperable range U.

If the intermediate posture vector Kn is included in the inoperable range U (YES at step S135), the intermediate posture correction is performed by the correction unit 43 in step S300. On the other hand, if the intermediate posture vector Kn is not included in the inoperable range U (NO at step S135), step S136 is performed.

In step S136, the rotation angle calculation unit 24 acquires the data of the axis vector Na and the axis vector Nc from the storage unit 26, and calculates the rotation angles θ and Φ around the A-axis and the C-axis.

Figure 13:
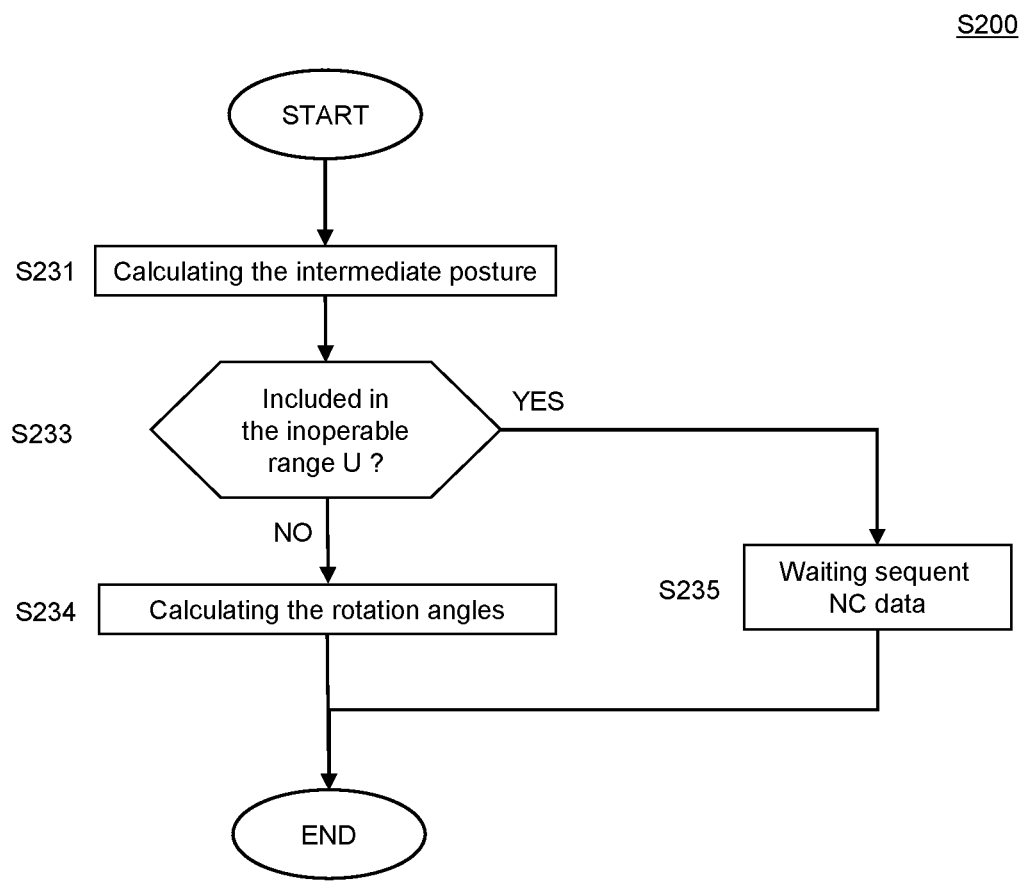
FIG. 13 is a diagram for explaining a procedure of processing point correction at step S200 in FIG. 12.

With reference to FIG. 13, the flow of the processing point correction (step S200) will be described. In step S231, the processing posture calculation unit 23 calculates the intermediate posture vector Kn for the intermediate posture. In step S233, the determination unit 42 determines whether or not the intermediate posture vector Kn is included in the inoperable range U.

If the intermediate posture vector Kn is included in the inoperable range U (YES at step S233), step 235 is performed. On the other hand, if the intermediate posture vector Kn is not included in the inoperable range U (NO at step S132), step S234 is performed.

In step S234, the rotation angle calculation unit 24 acquires the data of the axis vector Na and the axis vector Nc from the storage unit 26, and calculates the rotation angles θ and Φ around the A-axis and the C-axis. In step S235, the correction unit 43 waits for the subsequent NC data without performing the subsequent calculation process.

Figure 14:
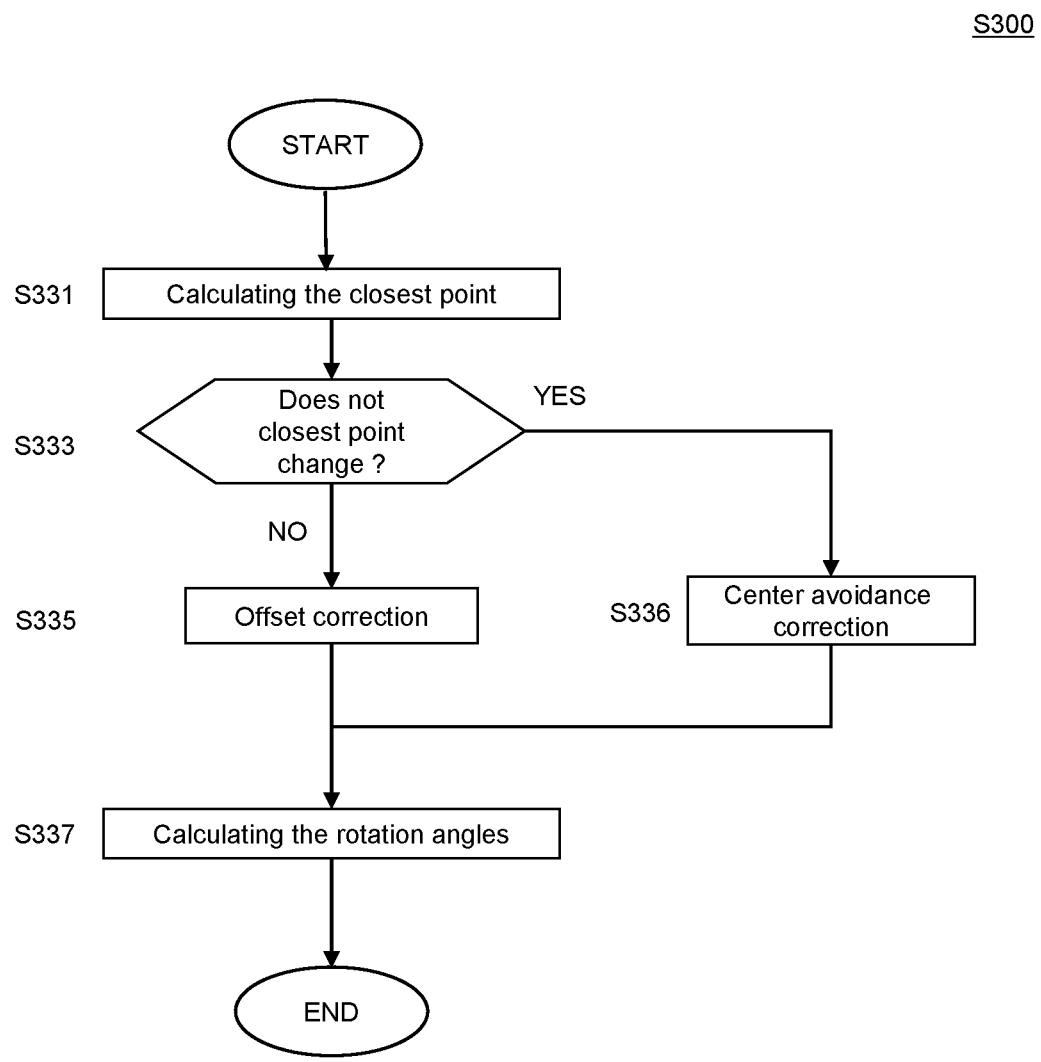
FIG. 14 is a diagram for explaining a procedure of intermediate posture correction at step S300 in FIG. 12.

With reference to FIG. 14, the flow of the intermediate posture correction (step S300) will be described. In step S331, the correction unit 43 calculates the closest point for the intermediate posture Kn included in the inoperable range U. In step S333, the correction unit 43 determines whether or not the closest point has changed with respect to the sequent intermediate posture Kn.

If the closest point does not change about the sequent intermediate posture Kn (YES at step S333), the correction unit 43 performs center avoidance correction as step S336. On the other hand, if the closest point changes with respect to the sequent intermediate posture Kn (NO at step S333), the correction unit 43 performs offset correction at step S335.

In step S337, the rotation angle calculation unit 24 acquires the data of the axis vector Na and the axis vector Nc from the storage unit 26, and calculates the rotation angles θ and D around the A-axis and the C-axis.

2. Other Embodiments

Although the embodiments and variations thereof in the present invention is described above, the application of the present disclosure is not limited to the above contents.

For example, in the above embodiment, the processing posture calculation unit 23 calculates the posture vector Kn in the intermediate posture, but the intermediate posture may be calculated in synchronization with the amount of movement in the three linear axes between the processing points. In this case, the number of divisions is determined to be proportional to the moving distance in the linear axis between the processing positions. As a result, the amount of movement in the linear axis direction and the change in posture are synchronized, and the change in posture can be smoothly performed.

Further, in the above embodiment, the posture of the work piece 8 is controlled by driving the tilt table 6 and the rotary table 7, and the posture of the work piece 8 with respect to the tool 5 is changed. But the present invention is not limited to this form. For example, the posture of the work piece 8 with respect to the tool 5 may be changed by controlling the posture of the tool 5.

Further, in the above embodiment, two rotation axes are provided on the table side such as the tilt table 6 and the rotary table 7, but the present invention is not limited to this embodiment. For example, the present invention can be applied to a form in which one rotation axis is provided on the table side and on the tool side respectively or a form in which a 5-axis processing machine provided with two rotation axes on the tool side.

Further, in the embodiment of the present invention, a 5-axis processing machine having the three linear axes of the X-axis, the Y-axis and the Z-axis and the two rotation axes of the A-axis and the C-axis has been described, but the present invention is not limited to this embodiment. For example, the rotation of the B axis (that is, the rotation axis parallel to the Y-axis) may be controlled instead of the A-axis. Further, the present invention can be applied to a processing machine having 6-axis control of the three linear axes of the X-axis, the Y-axis and the Z-axis and the three rotation axes of the A-axis, the B axis and the C-axis.

Further, in the above embodiment, the NC data for the processing object is stored in the storage unit 26, but the present invention is not limited to this embodiment. For example, NC data may be acquired from another storage medium, or may be acquired directly from an information processing device that generates NC data.

Further, in the above embodiment, the processing machine body 1 and the information processing device 10 are configured as separate devices, but the present invention is not limited to this embodiment. For example, each function included in the information processing device 10 may be built in the processing machine body 1.

Various embodiments according to the present invention have been described above, and these are presented as examples and are not intended to limit the scope of the invention. The novel embodiment can be implemented in various other forms, and various omissions, replacements, and changes can be made without departing from the gist of the invention. The embodiment and its modifications are included in the scope and gist of the invention, and are included in the scope of the invention described in the claims and the equivalent scope thereof.

What is claimed is:

1. A 5-axis processing machine comprising:
    a mounting table on which a tool and a work piece are placed; and
    a control unit including a calculation unit, a determination unit, and a correction unit; wherein
    the mounting table is moved relatively by three linear axes and two rotation axes based on NC data,
    the two rotation axes include a first axis and a second axis,
    the calculation unit calculates an orientation of the work piece with respect to the tool at a time of processing from NC data and a directions of rotation centers of an actual first axis and an actual second axis,
    the determination unit determines whether or not the calculated orientation of the work piece is included in an inoperable range, the inoperable range being the inoperable angle range, and
    the correction unit corrects the orientation of the work piece with respect to the tool when the calculated orientation of the work piece is included in the inoperable range.

2. The machine of claim 1, wherein
    the correction unit corrects the orientation of the work piece with respect to the tool so as to be a boundary value in the inoperable range when the orientation of the work piece between processing points of the work piece specified in the NC data is included in the inoperable range.

3. The machine of claim 2, wherein
    the correction unit divides an angle between a posture of a processing point outside the inoperable range and a posture of a subsequent processing point outside the inoperable range, and corrects the orientation of the work piece with respect to the tool so as to take the divided angle when a trajectory for shifting the orientation of the work piece between the processing points passes through a position defined as a center of the inoperable range.

4. The machine of claim 1, wherein
    the correction unit does not perform a subsequent calculation process until the orientation of the work piece with respect to the tool at a processing point specified in a subsequent NC data goes out of the inoperable range when the orientation of the work piece with respect to the tool at the processing point specified in the NC data is included in the inoperable range.

5. The machine of claim 4, wherein
    the correction unit divides an angle between a posture specified outside the inoperable range and a posture of the processing point outside the inoperable range, and corrects the orientation of the work piece with respect to the tool so as to take the divided angle when the orientation of the work piece at the processing point specified in the subsequent NC data goes out of the inoperable range.

6. The machine of claim 1, wherein
    when calculating the orientation of the work piece with respect to the tool, the calculation unit calculates a three dimensional sphere formed by an angle representing the orientation of the work piece and a plane perpendicular to C-axis as the actual first axis, and calculates an angle represented by a region on a surface of the three dimensional sphere as the inoperable range, the region being defined by an intersection of the three dimensional sphere and the plane.

7. A control method of a 5-axis processing machine comprising:
    a calculation step calculating an orientation of a work piece with respect to a tool at a time of processing from NC data and a directions of rotation centers of an actual first axis and an actual second axis,
    a determination step determining whether or not the calculated orientation of the work piece is included in an inoperable range, the inoperable range being the inoperable angle range, and
    a correction step correcting the orientation of the work piece with respect to the tool when the calculated orientation of the work piece is included in the inoperable range.

* * * * *